(12) United States Patent
Keul (10) Patent No.: US 10,003,231 B2
(45) Date of Patent: Jun. 19, 2018

(54) ELECTRIC MACHINE AND METHOD FOR WINDING A COIL OF AN ELECTRIC MACHINE

(75) Inventor: Stefan Keul, Seligenstadt (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 1005 days.

(21) Appl. No.: 13/980,060

(22) PCT Filed: Jan. 18, 2012

(86) PCT No.: PCT/EP2012/000196
§ 371 (c)(1),
(2), (4) Date: Mar. 11, 2014

(87) PCT Pub. No.: WO2012/100921
PCT Pub. Date: Aug. 2, 2012

(65) Prior Publication Data
US 2014/0152140 A1    Jun. 5, 2014

(30) Foreign Application Priority Data
Jan. 24, 2011  (DE) .................. 10 2011 003 049

(51) Int. Cl.
*H02K 3/28* (2006.01)
*H02K 15/04* (2006.01)
*H02K 3/18* (2006.01)

(52) U.S. Cl.
CPC ........... *H02K 3/28* (2013.01); *H02K 15/0435* (2013.01); *H02K 3/18* (2013.01)

(58) Field of Classification Search
CPC ......... H02K 3/18; H02K 3/28; H02K 15/0435
(Continued)

(56) References Cited

U.S. PATENT DOCUMENTS

2005/0242677 A1* 11/2005 Akutsu .................... H02K 3/28
                                                              310/179
2006/0244332 A1* 11/2006 Wyremba ............. H02K 16/04
                                                              310/179
(Continued)

FOREIGN PATENT DOCUMENTS

EP        1076401 A2    2/2001
JP     2003324878 A    11/2003
(Continued)

OTHER PUBLICATIONS

PCT Search Report in PCT/EP2012/000196 dated May 13, 2013.

*Primary Examiner* — John K Kim
(74) *Attorney, Agent, or Firm* — Manelli Selter PLLC; Edward J. Stemberger (57) ABSTRACT

The present invention relates to an electric machine, in particular a brushless permanent magnet motor, comprising a stator which comprises a plurality of teeth having at least one needle-wound winding strand, the at least one winding strand having at least two windings on adjacent teeth which are arranged in series, the at least two windings each comprising at least one winding layer, a needle channel being provided which is formed between the at least two windings by a crossing portion of the at least two windings and is filled at least in part. The present invention further relates to a method for winding a coil of an electric machine.

3 Claims, 5 Drawing Sheets

(58) Field of Classification Search
USPC .......................................... 310/179, 180, 208
IPC ............................................... H02K 3/28,15/04
See application file for complete search history.

(56) References Cited

U.S. PATENT DOCUMENTS

2007/0057592 A1* 3/2007 Bhargava ............... H02K 1/278
310/184
2014/0152140 A1* 6/2014 Keul .................. H02K 15/0435
310/179

FOREIGN PATENT DOCUMENTS

JP        2005318733 A    11/2005
WO       2009055942 A1     5/2009

* cited by examiner

ELECTRIC MACHINE AND METHOD FOR WINDING A COIL OF AN ELECTRIC MACHINE

FIELD OF THE INVENTION

The present invention relates to an electric machine. The present invention further relates to a method for winding a coil.

TECHNICAL BACKGROUND

Electric machines of this type are generally known and are used for various purposes in various applications, for example in automatic motor vehicle transmissions. An electric machine of this type may for example be in the form of a brushless permanent magnet motor comprising a stator and a rotor having magnet poles. The stator comprises single-phase or multi-phase, for example three-phase, winding strands.

Constantly increasing requirements, in particular in a motor vehicle, with regard to a lowest possible constructional volume, low weight, high power density and simultaneously high efficiency with low development of noise result in the constant need to provide an improved electric machine.

SUMMARY OF THE INVENTION

Against this background, the object of the present invention is to specify an improved electric machine.

According to the invention, this object is achieved by an electric machine having the features of claim 1.

Accordingly, the following are provided:

An electric machine, in particular a brushless permanent magnet motor, comprising a stator which comprises a plurality of teeth having at least one needle-wound winding strand, the at least one winding strand having at least two windings on adjacent teeth which are arranged in series, the at least two windings each comprising at least one winding layer, a needle channel being provided which is formed between the at least two windings by a crossing portion of the at least two windings and is filled at least in part.

A method for winding a coil of an electric machine, in particular of a brushless permanent magnet motor, by means of a needle winder, comprising the following method steps: (S0) providing a coil of a winding carrier having a plurality of teeth, the coil comprising at least two windings on adjacent teeth which are arranged in series and the at least two windings each comprising at least one winding layer; (S1) producing the respective at least one winding layer of a first of the at least two windings by winding a winding wire around a first tooth; (S2) producing the respective at least one winding layer of a second of the at least two windings by winding the winding wire around a second tooth; (S3) producing the final winding layer by winding the winding wire around both the second tooth and the first tooth.

The finding/idea behind the present invention is that filling the needle channel at least in part results in an increased filling level. This results in an increased power density of the electric machine. Depending on the filling level of the needle channel, a considerable power increase of for example approximately 30% can be made possible.

The solution according to the invention results in a considerably higher efficiency of the electric machine, since the same magnetic flux becomes possible with a shorter length of laid wire. This also reduces the ohmic losses at the same motor power. An electric machine having a particular nominal power can thus be made smaller, lighter and more cost-effective.

Preferably, two or more than two winding layers are provided. However, it is also possible in principle for only one winding layer to be provided and for this immediately to be configured as a figure of eight.

Advantageous embodiments and developments may be found in the further dependent claims and in the description with reference to the drawings.

A final winding layer of the at least two winding layers can be wound around the adjacent teeth in a figure of eight, a crossing portion being formed in the needle channel and making use of the needle channel.

In a preferred embodiment, the stator may comprise twelve grooves. However, a stator comprising eighteen or generally comprising 12+n*6 grooves would also be conceivable and advantageous, n being in this case an even natural number greater than zero. However, other configurations of the stators and the number of grooves may also be possible and advantageous.

The at least two windings preferably have opposite winding directions.

The first winding of the at least two windings can be connected via a wire bridge of the winding wire to the second of the at least two windings. This makes continuous winding of both windings possible.

In one embodiment, the method may be carried out using a needle winder comprising at least one needle.

It is also possible for the needle winder to wind with at least two needles synchronously. In this way, an even higher filling level of the electric machine is achieved. In the case of a stator comprising twelve grooves, a needle winder can wind with six needles simultaneously. This makes particularly high filling of the needle channels possible. At the same time, in this context an increase in the productivity of the needle winder system can be achieved.

The method can not only be used for winding carriers of an electric machine where the winding carrier is a stator, but can also be applied to coils of other winding carriers.

An electric machine of this type can be smaller and lighter. This is the case in particular for the purpose of driving many different functional units (automatic transmissions, window lifters, all types of adjustment drives etc.) of motor vehicles. In particular in motor vehicles which use a plurality of electric machines of this type, the weight reduction becomes noticeable in a particularly advantageous manner, and this ultimately contributes to a reduction in the $CO_2$ output.

A further field of use of electric machines of this type may be bicycles, for example the dynamos thereof.

The above configurations and developments of the invention can be combined with one another in any desired manner.

Within reason, the above configurations and developments can be combined with one another in any desired manner. Further possible configurations, developments and implementations of the invention also comprise combinations, which are not explicitly mentioned, of features of the invention which are disclosed above or in the following in relation to the embodiments. In particular, in this context the person skilled in the art will also add individual aspects as improvements or supplements to the respective basic form of the present invention.

LIST OF CONTENTS OF THE DRAWINGS

The present invention is described in greater detail in the following by way of the embodiments shown in the schematic drawings, in which.

The appended drawings are intended to provide further understanding of the embodiments of the invention. They illustrate embodiments and, in combination with the description, serve to explain principles and concepts of the invention. Other embodiments and many of the mentioned advantages can be seen in relation to the drawings. The elements of the drawings are not necessarily shown to scale with one another.

In the drawings, like, functionally equivalent and similarly operating elements, features and components are provided with the same reference numerals in each case, unless stated otherwise.

DESCRIPTION OF EMBODIMENTS

Figure 1:
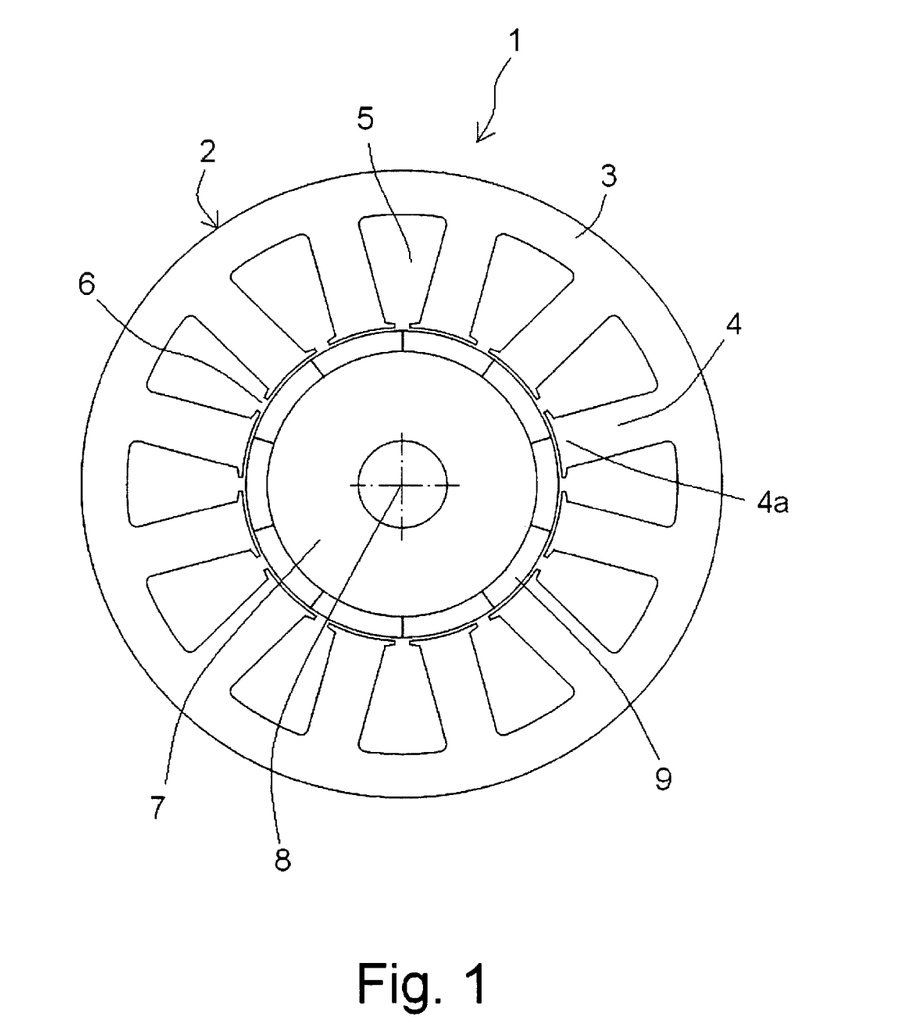
FIG. 1 is a schematic plan view of an electric machine.

FIG. 1 is a schematic plan view of an electric machine 1.

In this example, the electric machine 1 is constructed as a brushless permanent magnet motor and comprises a stator 2 having a circumferential yoke 3 to which radially inwardly pointing teeth 4 are attached. The teeth 4 are also referred to as individual teeth. In this context, the inner ends of the teeth are referred to as tooth heads 4a. The stator 2 comprising the teeth 4 forms a winding carrier for coils. Between every two teeth, winding chambers 5, described in greater detail below, for windings or coils of winding wire are fixed around a tooth 4 in each case. The winding spaces 5 extend perpendicular to the plane of the drawing and taper radially inwards, a groove 6 being arranged between every two inner tooth heads 4a. The teeth 4 enclose a rotor 7, which is arranged within the stator 2 so as to be able to rotate about a rotor axle 8. The rotor 7 comprises magnets 9 having alternating magnet poles on the circumferential surface thereof.

In this example, the number of teeth 4 of the stator 2 is twelve. Stator variants are possible with for example 18, 24 or 12+n*6 grooves.

The electric machine 1 is provided for at least a single-phase winding. In the example shown here, it is made three-phase with winding strands u, v, w. The winding of the stator 2 or outer stator is produced by a needle winder.

Figures 2, 3:
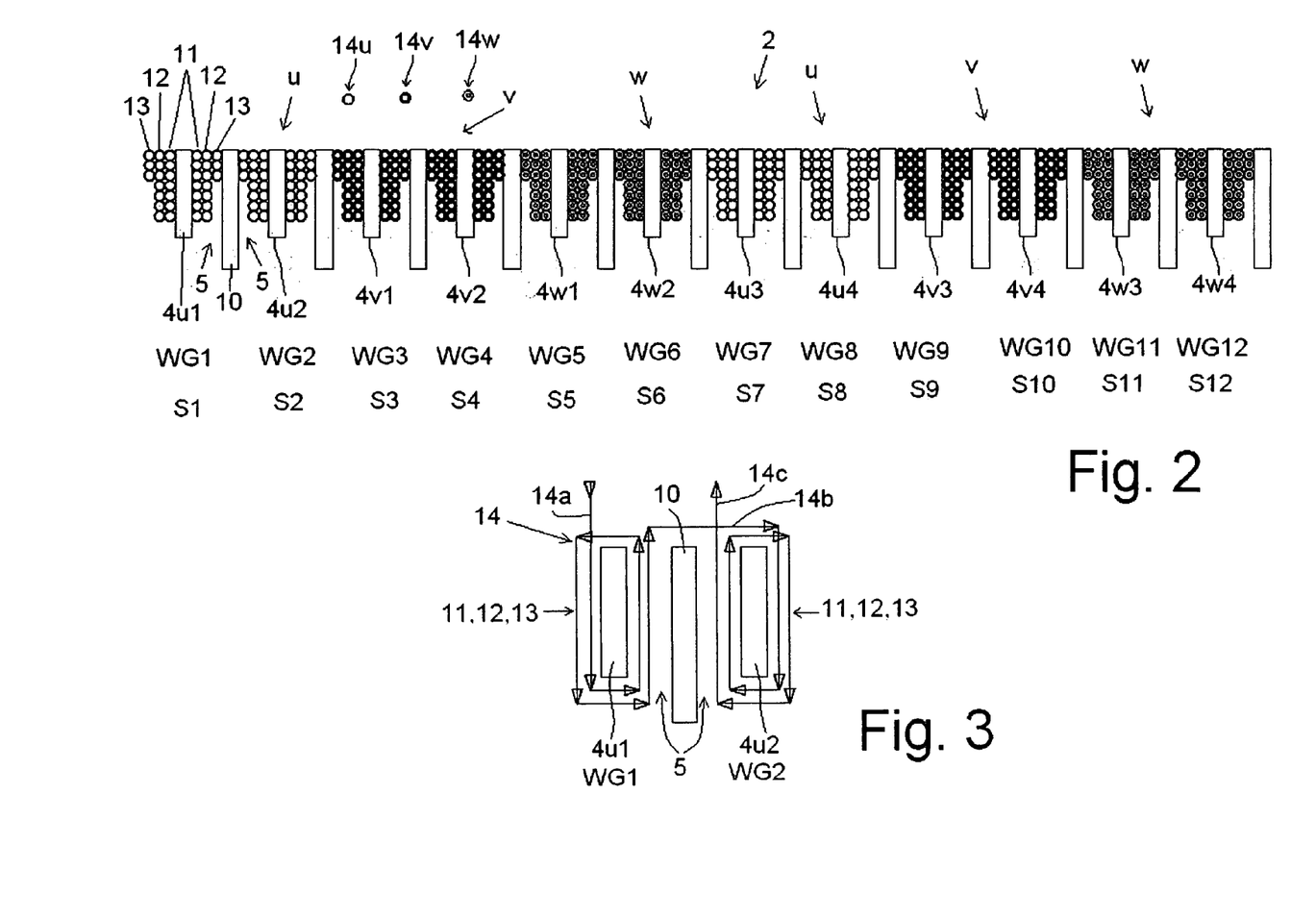
FIG. 2 is an exemplary schematic winding distribution, wound in the cross-section, of the electric machine according to FIG. 1.
FIG. 3 is a schematic drawing of two windings around a tooth pair of the winding distribution according to FIG. 2.

FIG. 2 shows an exemplary schematic winding distribution, wound in the cross-section, of the stator 2 of the electric machine 1 in accordance with FIG. 1.

The windings are produced using a needle winder comprising a needle.

The teeth 4 of the stator 2 are shown schematically as elongate rectangles, the relationship thereof with the three winding strands u, v and w being indicated in the reference numerals. Winding wires 14u, 14v, 14w are distinguished by different circle markings. Each winding wire 14u, 14v, 14w forms a respective winding WG1 . . . 12 around a tooth 4 of two tooth pairs in the following breakdown. The winding wire 14u forms a first winding WG1 around a tooth 4u1 and a second winding WG2, arranged in series therewith, around an adjacently arranged tooth 4u2. On top of this, the winding wire 14u forms a third winding WG7 around a tooth 4u3 offset by 150° and a fourth winding WG8 around an adjacently arranged tooth 4u4.

Similarly, the winding wire 14v forms a first winding WG3 around a tooth 4v1 and a second winding WG4, arranged in series therewith, around an adjacently arranged tooth 4v2. On top of this, the winding wire 14v forms a third winding WG9 around a tooth 4v3 offset by 150° and a fourth winding WG10 around an adjacently arranged tooth 4v4.

Likewise, the winding wire 14w forms a first winding WG5 around a tooth 4w1 and a second winding WG6, arranged in series therewith, around an adjacently arranged tooth 4w2. On top of this, the winding wire 14w forms a third winding WG11 around a tooth 4w3 offset by 150° and a fourth winding WG12 around an adjacently arranged tooth 4w4.

The teeth 4u1 . . . 2, 4v1 . . . 2, 4w1 . . . 2, 4u3 . . . 4, 4v3 . . . 4 and 4w3 . . . 4 form a tooth pair in each case.

Each of the winding strands u, v, w thus comprises a series connection of four individual windings.

The windings WG1 . . . 12 are arranged in the winding chambers 5. In this context, each winding chamber 5 is occupied by two winding portions. There is a free space between the winding portions in each case, which is referred to as a needle channel 10 and is shown as an elongate rectangle in this case. The needle channels 10 are necessary for the winding needle of the needle winder for producing the windings WG1 . . . 12. Reference numerals S1 . . . S12 denote individual steps for producing the winding. The width of a needle channel 10 is dependent on the number of needles of a needle winder. In the example shown in FIG. 2, a needle winder comprising only one needle is applied.

In this context, each of the windings WG1 . . . 12 consists of three winding layers 11, 12, 13, which are positioned on top of one another. Depending on the configuration, there may be more or fewer layers. The first and second winding layers 11, 12 extend over more than three quarters of the respective tooth 4. The third, that is to say in this case the last and upper winding layer 3 is only formed in part as a result of the shape of the winding chamber 5 (see FIG. 1).

FIG. 3 is a schematic drawing of the windings WG1 and WG2 around the tooth pair 4u1, 4u2 of the winding distribution according to FIG. 2.

A winding wire 14 having a wire start 14a is wound around the first tooth 4u1 in a first winding direction, in this case anti-clockwise, with the three layers 11, 12, 13. In this context, the winding chamber 5 is filled between the tooth 4u1 and the needle channel 10 with a winding portion of the first winding WG1. The winding wire 14 is subsequently continued as a wire bridge 14b to the adjacently positioned tooth 4u2 and wound around it clockwise with three layers 11, 12, 13, the winding chamber 5 being filled with a winding portion of the second winding WG2 between the tooth 4u2 and the needle channel 10, in such a way that the needle channel 10 is still maintained. One wire end 14c of the winding wire 14 is passed out of the winding chamber 5 and passed to the next associated tooth pair 4u3, 4u4. In a winding process of this type, the needle of the needle winder moves through the needle channel 10.

Figure 4:
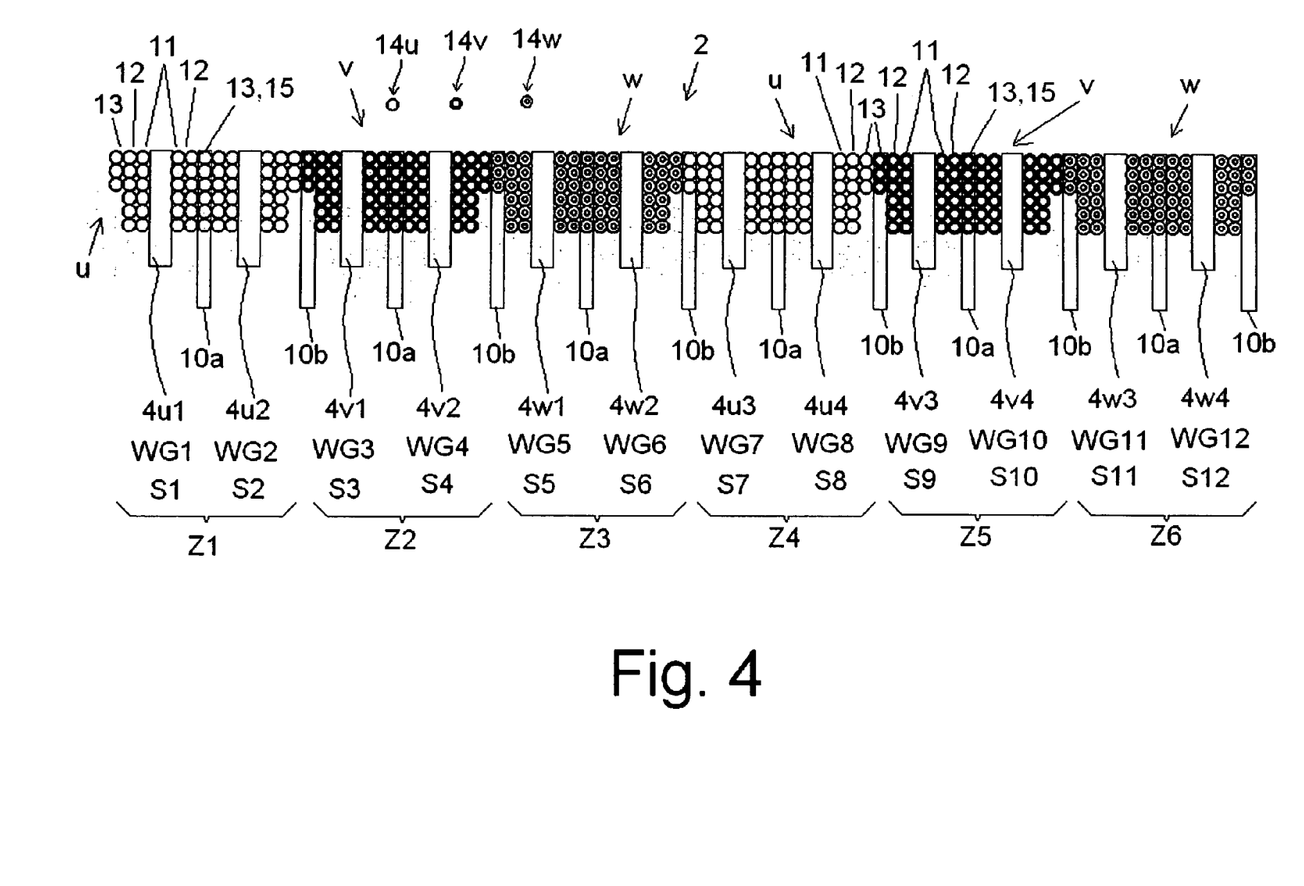
FIG. 4 shows a first embodiment of a schematic winding distribution, wound in the cross-section, of the electric machine according to the invention in accordance with FIG. 1.

FIG. 4 shows a first embodiment of a schematic winding distribution, wound in the cross-section, of the electric machine 1 according to the invention in accordance with FIG. 1.

The windings are produced using a needle winder comprising a needle.

By contrast with the winding distribution in accordance with FIG. 2, in the first embodiment six needle channels 10a and six half needle channels 10b are filled with windings. In this context, after carrying out two steps S1 . . . 2, S3 . . . 4, S5 . . . 6, S7 . . . 8, S9 . . . 10, S11 . . . 12 in each case via a respective intermediate step Z1 . . . 12, in each case the last winding layer 13 on a tooth pair 4u1 . . . 2, 4v1 . . . 2, 4w1 . . . 2, 4u3 . . . 4, 4v3 . . . 4 and 4w3 . . . 4 is wound in such a way that a completely filled needle channel 10a is produced between the teeth of a teeth pair 4u1 . . . 2, 4v1 . . . 2, 4w1 . . . 2, 4u3 . . . 4, 4v3 . . . 4 and 4w3 . . . 4. The respective needle channel 10b between the tooth pairs 4u1 . . . 2, 4v1 . . . 2, 4w1 . . . 2, 4u3 . . . 4, 4v3 . . . 4 and 4w3 . . . 4 is thus half-filled.

Figure 5:
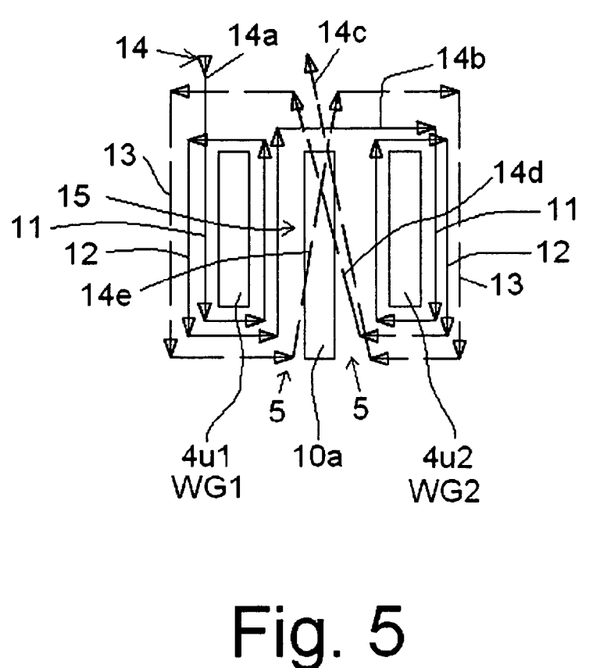
FIG. 5 is a schematic drawing of two windings according to the invention around a tooth pair of the winding distribution according to FIG. 4.

For this purpose, FIG. 5 is a schematic drawing of two windings WG1, WG2 according to the invention around the tooth pair 4u1, 4u2 of the winding distribution according to FIG. 4.

In accordance with a method according to the invention, in a first method step a wire start 14a of the winding wire 14 is wound around the first tooth 4u1 in a first winding direction, in this case anti-clockwise, with two layers 11 and 12. In this context, the winding chamber 5 is filled between the tooth 4u1 and the needle channel 10a with a winding portion of the first winding WG1. Subsequently, in a second method step, the winding wire 14 is continued to the adjacently positioned tooth 4u2 as a wire bridge 14b and wound around it clockwise with two layers 11 and 12, the winding chamber 5 between the tooth 4u2 and the needle channel 10a being filled with a winding portion of the second winding WG2, in such a way that the needle channel 10a is still maintained.

Subsequently, in a third method step, the winding wire 14 is wound both around the second tooth 4u2 and around the first tooth 4u1 in a figure of eight as a third and last winding layer (shown as a dashed line). In this context, after completing the second winding layer 12 of the second winding WB2 of the second tooth 4u2, a crossing portion 14d of the winding wire 14 is passed from the second tooth 4u2 through the winding chamber 5 back through the needle channel 10a again towards the wire start 14a on the first tooth 4u1 and passed further clockwise around the first tooth 4u1 as far as the needle channel 10a. The needle channel 10a is subsequently passed through by a second crossing portion 14e of the winding wire 14, the crossing portion 14e of the winding wire 14 crossing the first crossing portion 14d in the needle channel 10. The winding wire 14 is subsequently wound further clockwise around the second tooth 4u2 to complete the figure of eight. This process of winding a figure of eight around the two teeth of the tooth pair 4u1 . . . 2 is repeated until the third and last winding layer 13 is complete. The crossing portions 14d, 14e fill the needle channel 10a completely and form a crossing portion 15. Subsequently, the wire end 14c of the winding wire 14 is passed out of the winding chamber 5 and passed to the next associated tooth pair 4u3, 4u4.

This method takes place on all of the tooth pairs 4u1 . . . 2, 4v1 . . . 2, 4w1 . . . 2, 4u3 . . . 4, 4v3 . . . 4 and 4w3 . . . 4.

Figure 6:
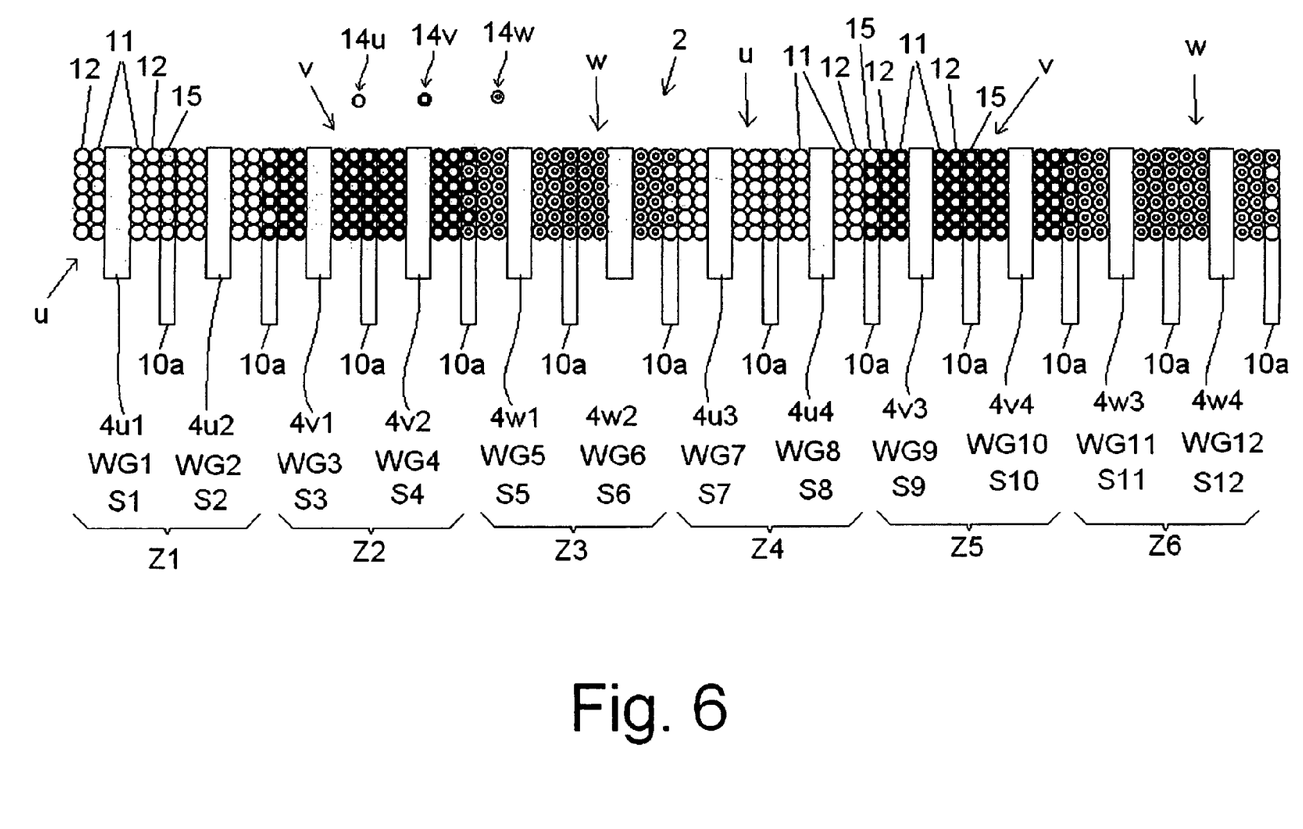
FIG. 6 shows a second embodiment of a schematic winding distribution, wound in the cross-section, of the electric machine according to the invention in accordance with FIG. 1.

FIG. 6 shows a second embodiment of a schematic winding distribution, wound in the cross-section, of the electric machine 1 according to the invention in accordance with FIG. 1.

By contrast with the first embodiment in accordance with FIG. 4, in this case all of the needle channels 10a are completely filled. This is achieved in that the windings are produced with a needle winder which is equipped with six needles. By synchronously winding with the six needles, all of the needle channels 10a are filled and each comprise the crossing portion 15. In this context, three of the six needles have a clockwise winding direction and three have an anti-clockwise winding direction.

Although the present invention has been described in the above by way of a preferred embodiment, it is not limited thereto, but can be modified in any desired manner without departing from the subject matter of the present invention.

It may also be possible for more than four windings to be used per winding strand u, v, w, for example six, eight, ten etc. Naturally, just one winding strand (single-phase) u, v, w or else more than three winding strands u, v, w may be produced.

The windings can be produced using a needle winder comprising one or more needles. Naturally, the winding method may also be applied with numbers of grooves other than the number shown.

It is also conceivable for not only windings as shown, but also other types to be produced instead of external stators, for example rotors.

Depending on the number of needles and the configuration of the needle winder, the needle channels 10, 10a, 10b are configured correspondingly in terms of width.

It is further conceivable to be able to wind around not only two, but also a plurality of adjacent teeth by the method, with windings positioned or connected in series, it being possible for the last layer to be configured in a double, triple or multiple figure of eight. Thus, for example, in the case of three adjacent teeth the two needle channels 10a are each filled with a crossing portion 15.

LIST OF REFERENCE NUMERALS

1 Electric machine
2 Stator
3 Yoke
4 Tooth
4u1 . . . u4 Teeth
4v1 . . . 4 Teeth
4w1 . . . 4 Teeth
4a Tooth head
5 Winding chamber
6 Groove
7 Rotor
8 Rotor axis
9 Magnet
10-10b Needle channel
11 First winding layer
12 Second winding layer
13 Third winding layer
14 Winding wire
14a Wire start 14b Wire bridge
14c Wire end
14d First crossing portion
14e Second crossing portion
14u Winding wire of u winding
14v Winding wire of v winding
14w Winding wire of w winding
15 Crossing portion
S1-S2 Steps
u, v, w Winding strands
WG1 . . . 12 Windings
Z1-12 Intermediate steps

The invention claimed is:

1. An electric machine comprising:
a stator which comprises a plurality of teeth having at least one needle-wound winding strand comprising a winding wire, the at least one winding strand having at least two windings on adjacent teeth comprising a first tooth and a second tooth which are arranged in series, the at least two windings each comprising at least two winding layers, wherein the winding wire is wound around the first tooth in a first winding direction, a winding chamber is filled with a winding portion between the first tooth and a needle channel that is provided between the first tooth and the second tooth, the winding wire is continued to the adjacently positioned second tooth as a wire bridge and wound around it in a second winding direction opposite the first winding direction, wherein the winding chamber between the second tooth and the needle channel is filled with a winding portion of the second winding, the winding wire is wound both around the second tooth and around the first tooth in a figure of eight as a third and last winding layer, wherein a first crossing portion of the winding wire is passed from the second tooth through the winding chamber back through the needle channel again towards the first tooth and passed further around the first tooth as far as the needle channel, the needle channel is subsequently passed through by a second crossing portion of the winding wire, the second crossing portion of the winding wire crossing the first crossing portion in the needle channel, the winding wire is subsequently wound further around the second tooth to complete the figure of eight, the first and second crossing portions fill the needle channel completely and form a crossing portion.

2. The machine of claim 1, wherein the stator comprises twelve or 12+n*6 grooves, wherein n is a natural number.

3. The machine of claim 1, wherein the machine is a brushless permanent magnet motor.

* * * * *